United States Patent [19]

Folk

[11] 3,874,077

[45] Apr. 1, 1975

[54] METHOD AND APPARATUS FOR CENTERING AND SHEARING THE FREE END PORTION OF A PLURALITY OF LEADS WHICH EXTEND OUTWARDLY FROM ONE END OF A TEMPLATE

[75] Inventor: Kenneth Foster Folk, Harrisburg, Pa.

[73] Assignee: AMP Incorported, Harrisburg, Pa.

[22] Filed: Dec. 12, 1973

[21] Appl. No.: 424,131

[52] U.S. Cl. ............. 29/628, 29/203 DS, 29/203 P, 29/630 A

[51] Int. Cl. ............................................ H01r 43/00

[58] Field of Search ....... 29/203 HT, 203 MW, 628, 29/629, 630 B, 461, 407, 203 D, 203 DT, 203 DB; 140/147; 113/119; 72/324, 404

[56] References Cited

UNITED STATES PATENTS

| | | | |
|---|---|---|---|
| 3,195,584 | 7/1966 | Zimmerman et al. | 140/147 |
| 3,283,987 | 11/1966 | Kauffman | 29/630 B |
| 3,450,829 | 6/1969 | Paul | 29/628 |
| 3,687,172 | 8/1972 | Suverkropp | 53/21 R |
| 3,707,756 | 1/1973 | Wolyn | 29/203 D |
| 3,708,853 | 1/1973 | Humen et al. | 29/203 D |
| 3,747,186 | 7/1973 | Cervenka et al. | 29/203 D |
| 3,765,073 | 10/1973 | Burns | 29/203 D |

FOREIGN PATENTS OR APPLICATIONS

| | | | |
|---|---|---|---|
| 1,078,548 | 8/1967 | United Kingdom | 140/147 |

OTHER PUBLICATIONS

IBM Technical Disclosure Bulletin., Vol. 6, No. 4, pgs. 28–29, 1974.

*Primary Examiner*—C. W. Lanham
*Assistant Examiner*—James R. Duzan
*Attorney, Agent, or Firm*—AMP Incorporated

[57] ABSTRACT

A method and apparatus for shearing the ends of the free end sections of a plurality of leads in which the free end sections are positioned in a desired spatial location prior to and during the shearing of the ends of the free end lead sections. The plurality of leads are initially positioned in a plurality of grooves which extend to one end of a template, the leads having free end portions which extend beyond the end of the template and pass through lead trimming or shearing means. Means are provided adjacent the end of the template to engage and properly position the free end portions immediately prior to and during the shearing operation so that the ends of the leads will extend directly away from the end of the template means to insure that the terminal end portions of the leads which project beyond the end of the template after shearing are of the desired final length suitable for a terminal applying operation.

11 Claims, 12 Drawing Figures

METHOD AND APPARATUS FOR CENTERING AND SHEARING THE FREE END PORTION OF A PLURALITY OF LEADS WHICH EXTEND OUTWARDLY FROM ONE END OF A TEMPLATE

CROSS REFERENCE TO RELATED APPLICATIONS

This application relates to U.S. application Ser. No. 389,924 filed Aug. 20, 1973 and entitled "Method And Apparatus For Positioning Leading Portions Of Individual Wires Of A Plurality Of Wires In Spaced Apart Relationships With Respect To Each Other And A Template Utilized In Accomplishing The Same," and also to U.S. application Ser. No. 424,129 filed concurrently with this application and entitled "Method And Apparatus For Varying The Relative Length Of A Plurality Of Leads And For Performing Work Operations On The Ends Of Leads Of Differing Relative Length," both of these related applications being assigned to the same assignee as this application, and the second of these related applications being a continuation-in-part of the first application. This application is also related to U.S. applications Ser. Nos. 424,130 and 424,132 which were filed concurrently with this application and which are also commonly assigned.

FIELD OF THE INVENTION

The present invention relates generally to a method and apparatus for shearing the free end portion of a plurality of leads, the free end portion of the leads extending beyond one end of a template, other portions of the leads being disposed in spaced apart grooves on the template, the grooves extending to said one end of the template. More particularly, the present invention relates to a method and apparatus for holding the free end portions of a plurality of leads in line with other portions of the leads disposed within grooves on the template and at right angles to the end of the template so that as the end of the leads are sheared the terminal end portion of the leads remaining after shearing will be of a predetermined length suitable for a terminal applying operation which may be performed on the remaining terminal end portions.

BACKGROUND OF THE INVENTION

In U.S. patent application Ser. No. 389,924 a method and apparatus is disclosed which positions a plurality of associated leads in spaced apart relationship with respect to each other, this positioning being done by an apparatus which includes a template having a plurality of spaced apart grooves which emanate from a primary groove, the spaced apart grooves being capable of receiving only a single lead and the primary groove being capable of receiving the end of a multi-lead cable from which a plurality of free end lead sections emanate. According to the method of the aforesaid application, the end of the multi-lead cable is placed in the primary groove with the portion of the free end sections adjacent the multi-lead cable overlying that portion of the plurality of spaced apart grooves which is disposed adjacent the primary groove, and the free end lead sections are then forced into the plurality of grooves by an oscillating roller or the like which is biased toward the template and moves from the primary groove toward the end of the plurality of grooves which extend away from the primary groove. Once the free end lead sections have been forced into the plurality of grooves, they are then in a location generally suitable for subsequent machine operations which include the trimming of the ends of the leads, the application of a plurality of terminals or the like to the ends of the free end sections, and/or other operations.

While U.S. patent application Ser. No. 389,924 does not disclose apparatus for shearing the ends of the leads and apparatus for applying terminals to the terminal end portion of the leads which remain after shearing, such an apparatus is disclosed in U.S. patent application Ser. No. 424,129 which is filed concurrently with this application. When utilizing the terminal and shearing apparatus of U.S. patent application Ser. No. 424,129 difficulties have been encountered in certain situations. Thus, if the leads which have been disposed in the grooves of the template are of relatively soft or flexible material, they may extend away at an angle from the template. While the shearing and terminal applying operations can generally be completed even though the leads extend away at an angle from the template, it is not possible to insure that the length of the terminal end portion of the leads remaining after shearing are of the desired final length. If the leads extend away from the template at a relatively severe angle, the length of the terminal end portion of the leads after shearing may be too long, and thus, the end of the terminal end portion may extend well beyond the barrel portion of the terminal after the barrel portion of the terminal has been crimped about the terminal end portion of the associated lead. This additional portion of the lead may interfere with the application of the terminal to the device to which the terminal is to be associated. Thus, if the terminal is to be disposed about an electrical post and to be held in place about the electrical post by a fastener threaded about the post, it may be that the the fastener will contact the lead rather than the terminal if the terminal end portion of the lead is too long. Thus, it is essential that the leads be properly positioned prior to shearing so that the final terminal assembly does not have a lead which projects too far beyond the barrel portion of the terminal.

OBJECTS AND SUMMARY OF THE INVENTION

It is a principle object of the present invention to provide a method and apparatus for engaging and positioning the free end portion of a plurality of leads, the free end portion extending beyond one end of a template, so that the leads can be sheared to a predetermined length.

More specifically, it is an object of the present invention to position a plurality of leads into a plurality of grooves in a template with free end portions of the leads extending beyond the ends of the grooves adjacent an end of the template, the free end portions of the leads also extending past a shearing or trimming apparatus disposed adjacent said end of the template, and to engage and position the free end portions of the leads in predetermined positions after they have been positioned in the grooves and prior to the shearing of the ends of the leads so that the terminal end portion of the leads remaining after shearing will be of the proper desired length.

It is a further object of the present invention to provide an apparatus for properly positioning a plurality of leads in a plurality of grooves on a template with free end portions of the plurality of leads extending beyond one end of the template so that when the end of the leads are trimmed or sheared the terminal end portions remaining after shearing will be of the proper desired length.

These and other objects and advantages of the present invention are accomplished by providing an apparatus including a template having a plurality of grooves which extend to one end of the template, each of the grooves being capable of receiving only a single lead, and also by providing structure for trimming the ends of a plurality of leads, the trimming structure being disposed adjacent said one end of the template, by holding a plurality of leads adjacent the other end of the grooves with free end sections of the plurality of leads extending away from the portion of the leads which are being held, by engaging the plurality of leads adjacent that portion which is being held by a roller and moving the roller towards the end of the template while maintaining the roller in contact with the plurality of leads to progressively force the leads into the grooves in the template, by subsequently engaging the free end portions of the leads which extend beyond said end of the template with a centering device to position these portions of the leads in predetermined locations where they preferably extend directly away from the template and in line with the terminal end portion of the grooves, and by subsequently shearing the ends of the leads so that the terminal end portion of the leads will be of proper desired length suitable for a terminal applying operation.

These and other objects and advantages of the present invention will be apparent to those skilled in the art after a consideration of the following description taken in conjunction with the accompanying drawings in which a preferred form of this invention is illustrated.

DESCRIPTION OF THE EMBODIMENT SHOWN IN THE DRAWINGS

Figure 1:
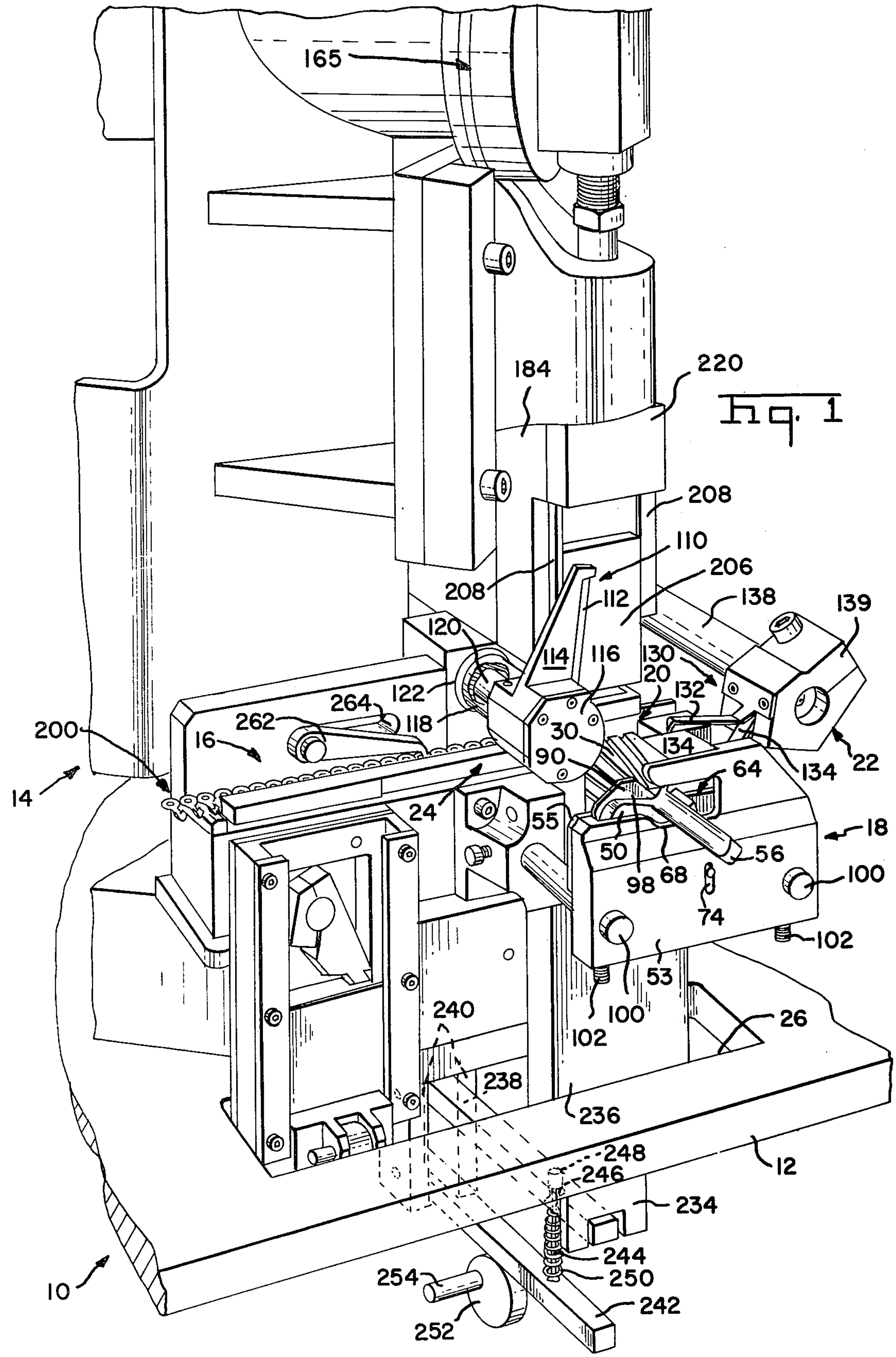
FIG. 1 is a perspective view of a portion of an apparatus which is utilized to perform the method of this application.

In the embodiment illustrated in the drawings an apparatus is illustrated which is utilized to perform work operations upon the free end lead sections of a multi-lead cable. It should be noted that this invention is suitable for performing work operations upon the free ends of leads other than the free end lead sections which extend from a multi-lead cable, and that slightly different forms of apparatus may be employed for differing work pieces.

Referring first to FIG. 1, a bench mounted apparatus indicated generally at 10, is shown mounted upon the top 12 of a bench. Mounted above the top of the bench are a press 14, terminal conveyor 16, holding means 18 operable to hold an end of a multi-lead cable, template means 20, lead engaging means 22 operable to move the ends of the free end lead sections which extend outwardly from the end of a multi-lead cable, and lead positioning means 24 which are operable to force the free end lead sections into grooves on the template means 20. Mounted on the press 14 are lead trimming means, and terminal applying means which will be described below. It should be noted at this point that various of the mechanisms are operatively connected to timed drives which cause the various mechanisms to be operated in a preferred sequential manner, some of the drives extending through an aperture 26 in the top of the bench. Since various timed drives may be suitably employed in the operation of the apparatus shown, many of these mechanisms have not been shown.

Figure 11:
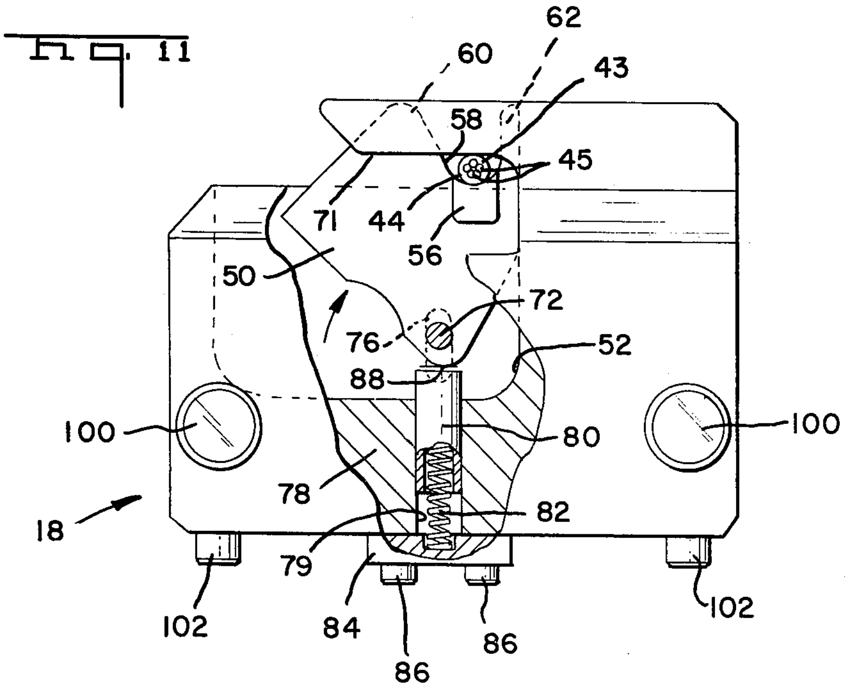
FIG. 11 is a view similar to FIG. 10 and shows the holding mechanism in its closed position.

The template means 20 includes a template 30, the template 30 having a plurality of grooves 32 formed in its upper surface. Each of the grooves 32 is of a size selected so that it can only accommodate one of the free end lead sections 34, the grooves having ends 36 which terminate at one end 38 of the template 30. This can be seen best from FIGS. 2 to 4. The ends 36 of the grooves at the end 38 of the template are spaced apart in a predetermined spatial relationship with respect to each other. At the other end of the template the other ends 40 of the grooves are disposed in juxtapositioned relationship with respect to each other. The other ends 40 of the grooves are so positioned so they can readily receive that portion of the free end sections of the leads 34 which extend outwardly from one end 42 of a multi-lead cable, indicated generally at 43. The multi-lead cable 43 has insulation 44 (FIG. 11) disposed about a plurality of leads 45. Before the multi-lead cable 43 is engaged by the holding means 18 of the apparatus, a portion of the insulation is stripped from the leads to expose the free end lead sections 34, each of the free end lead sections having an end 46. The portion of the insulation left about the leads 45 terminates in a facing edge 47. A sufficient amount of insulation is stripped from the end of the cable so that when the free end lead sections 34 are positioned in the grooves 32 of the template 30, a terminal end portion of the sections 34 will project beyond the end 38 of the template.

The template 30 is supported for relative vertical movement by a template support structure, indicated generally at 48, details of the structure 48 being described below. It should be noted at this point that the template is shown in its lower position in FIGS. 1, 2 and 9 and its raised position in FIGS. 3 through 8.

Figure 10:
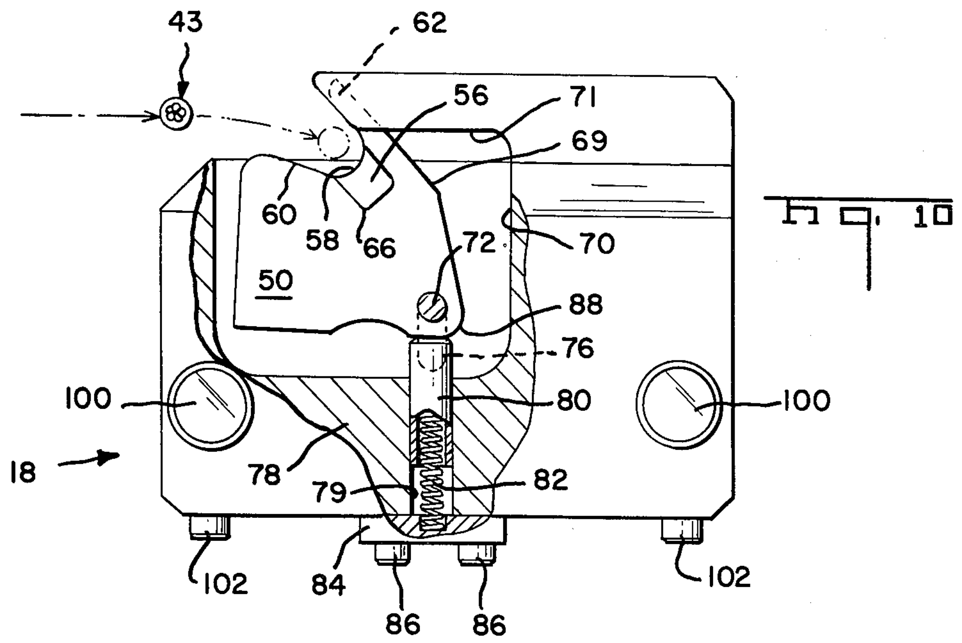
FIG. 10 is a side elevational view of the multi-lead holding mechanism taken along the lines 10—10 in FIG. 6 with parts being broken away for purposes of clarity, the holding mechanism being shown in its open position wherein it is adapted to receive one end of the multi-lead cable.

As previously noted the apparatus shown in these drawings is suitable for working upon the free end lead sections 34 of the multi-lead cable 43. The holding means 18 is employed to hold the end 42 of the multi-lead cable in proper oriented relationship with respect to the template 30, and particularly with respect to the other ends 40 of the grooves 32. The holding means includes a pivoted member 50 disposed between a sidewall 51 of a cut out portion or recess 52 of front member 53 and a sidewall 54 of backing plate 55. The pivoted member 50 has a channel-shaped handle portion 56 secured thereto, the channel-shaped handle portion extending forwardly of the member 50. The member 50 also includes a channel-shaped portion 58 which includes spaced apart sides 60, 62. The front member 53 is provided with an upper opening or notch 64 and the handle 56 extends through the notch 64. The member 50 is moved between a multi-lead cable receiving position shown in FIG. 10 to a multi-lead cable holding position shown in FIG. 11 through manual movement of the handle by the operator of the apparatus. When the pivoted member is in its cable receiving position shown in FIG. 10 and also in FIG. 1 the lower surface 66 of the handle portion 56 is in contact with the lower edge 68 of the notch 64. Similarly, when the pivoted member is in its holding position shown in FIG. 11 the right hand edge 69 of the member 50 is in contact with the right edge 70 of the recess 52. In this position the sides 60 and 62 extend generally upwardly and define with the upper wall 71 of the notch 64 a cavity or opening which receives and holds an end of the cable 42 in its desired position. The member 50 is supported for pivotal movement by a pivot pin 72 disposed for vertical sliding movement in elongated vertically extending aperture 74, 76 in the front member 53 and the rear backing plate 55. The front member 53 has a lower portion 78 which extends under the pivoted member 50, and the lower portion 78 is provided with a vertical aperture 79 that receives a sliding pin 80. The pin is normally biased upwardly by a spring 82, the upper end of the spring 82 being in contact with the sliding pin 80 and the lower end of the spring 82 being supported by a spring retaining member 84 which is secured to the lower surface of the lower portion 78 by means of capscrews 86. The pivoted member 50 is also provided with a cam surface 88 which contacts the upper surface of the pin 80, and the spring biased pin 80 cooperates with the cam surface 88 in such a manner that the pivoted member is restrained from movement when it is either in its multi-lead cable receiving position shown in FIG. 10 or in its multi-lead cable holding position shown in FIG. 11. By the employment of a pivot pin 72 which is movable in elongated apertures 74 and 76 and through the engagement of the pivoted member 50 with the spring biased pin, it should be noted that the pivoted member 50 can shift vertically when it is in its holding position shown in FIG. 11 so that different sized multi-lead cables can be held by the holding means 18.

A vertically disposed plate 90 (FIG. 6) is held in spaced apart relationship to the backing plate 55, the plate 90 being secured by welding or the like to L-shaped members 92 which are in turn secured by capscrews 94 to the backing plate 55, the capscrews also serving to hold the plate 55 to the member 53. The upper end of the plate 90 is provided with a guide surface 98. In practice the surface 98 adjacent the end 42 of the multi-lead cable is used to gauge the position of the cable 43 in the holding means 18. Thus, when positioning the end of the multi-lead cable in the holding device 18 it is desirable to bring the end 47 of the insulation 44 into contact with the surface 98 of the plate 90 prior to the handle 56 being swung from its lower position shown in FIG. 10 to its raised holding position shown in FIG. 11. This insures that the free end lead sections 34 and the end 42 of the cable will be properly positioned with respect to the grooves 32 in the template.

The holding means 18 is supported on the frame 10 by a pair of outwardly extending rods 100 which are suitably secured at one end to a portion of the apparatus, the rods 100 in turn passing through suitable apertures in the lower portion 78 of the front member 53, the front member 53 being adjustably secured to the rods 100 by screws 102.

Figures 2, 3:
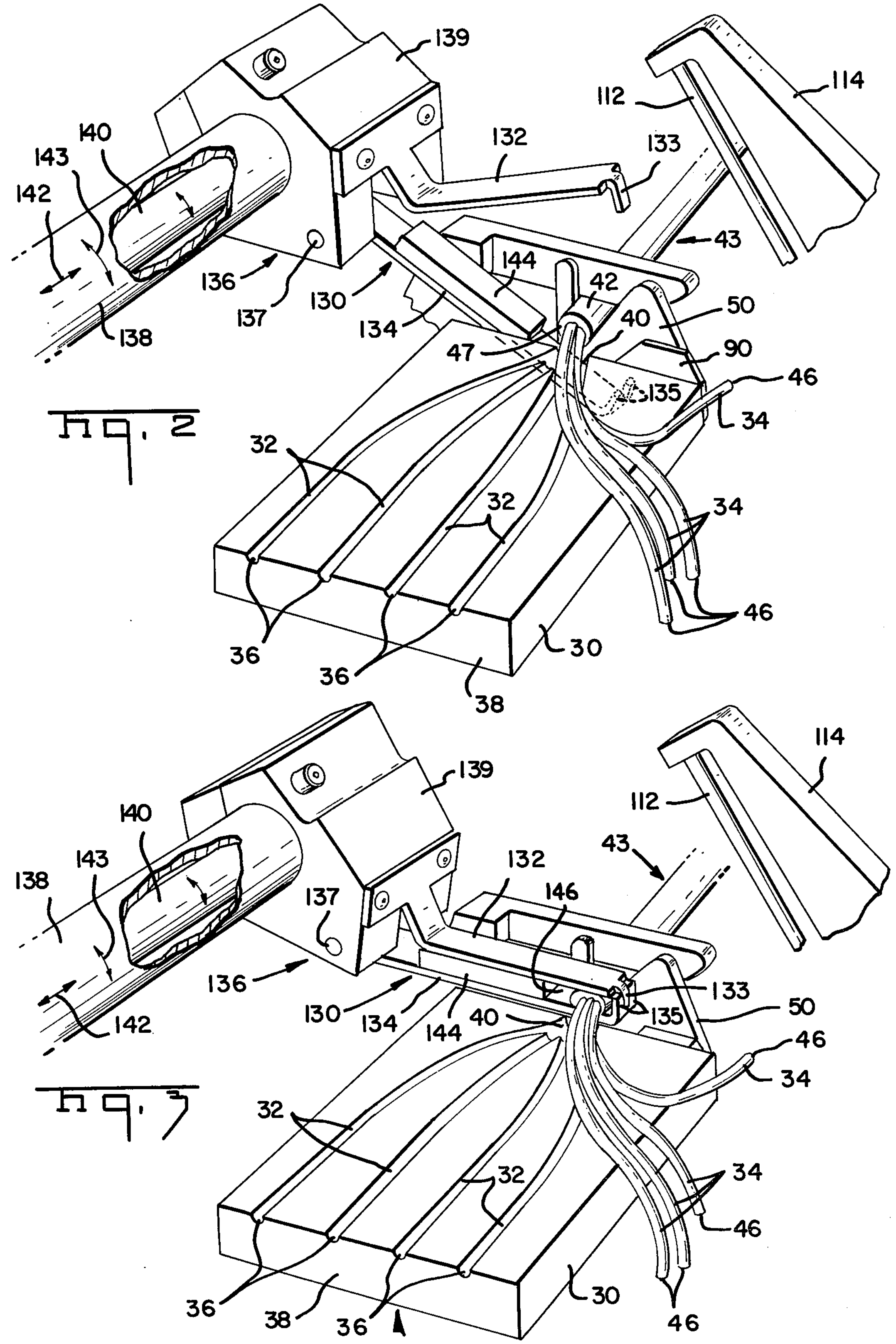
FIG. 2 is a perspective view of a portion of the apparatus shown in FIG. 1, this Figure showing one end of a multi-lead cable being disposed adjacent one end of a template having a plurality of spaced apart grooves, the mechanisms which engage the free end lead sections that extend outwardly from the multi-lead cable to properly position the ends and to force the free end lead sections into the grooves being shown in their inoperative positions.
FIG. 3 is a view similar to FIG. 2 showing the mechanism which engages the leads in its initial engaging position.

In accordance with the principles disclosed in U.S. application Ser. No. 389,924 the free end lead sections 34 of the multi-lead cable 43 are rolled into the grooves 32 on the template 30 by lead positioning means to orient the terminal end portions of the free end lead sections 34 at the end of the template so that subsequent work operations can be performed upon the ends of the leads by automatic machinery. The lead positioning means employed in this apparatus include roller means indicated generally at 110, the roller means including a roller 112 and a roller support 114. First roller mounting means 116 mount the roller means 110 for rotational movement about an axis concentric with the axis of the tubular member 118 which is transverse to the axis of the roller 112, the tubular member being spaced away from one end of the roller 112. To this end, the first roller mounting means 116 is journaled about the outer end of the tubular member 118 and is caused to rotate about the tubular member 118 by an internal rotatable shaft 120. Thus, by rotating the shaft 120 the roller means may be disposed in either a raised inoperative position as shown in FIGS. 1, 2 and 3 or in a lower operative position as shown in FIGS. 4 through 9. The tubular member 118 serves as a second roller mounting means and it can be extended toward and away from the holding means 18 to dispose the roller means between either a first position which is spaced adjacent the end of the plurality of grooves that are disposed adjacent the holding means and a second position disposed adjacent the ends of the grooves 36 adjacent the end 38 of the template remote from the holding means 18. The means to extend and retract the tubular member is not shown and is considered conventional, however, it should be noted that the tubular member 118 is journaled for sliding movement in bearing 122.

Figure 4:
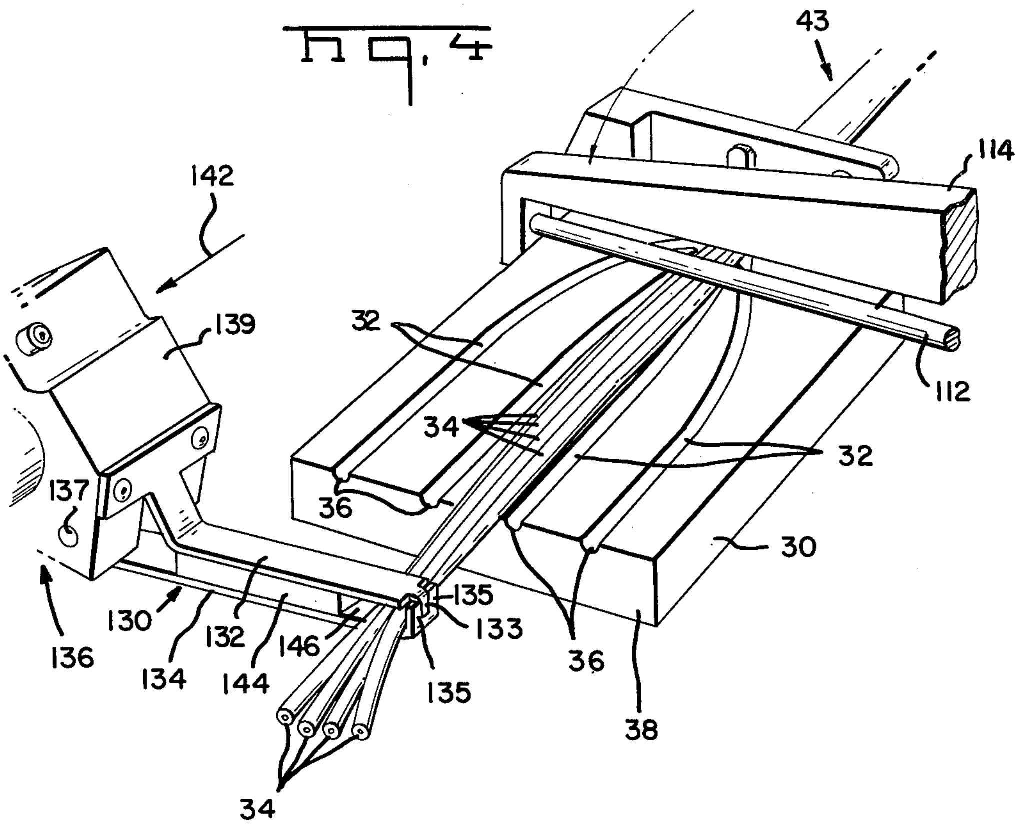
FIG. 4 is a view similar to FIGS. 2 and 3 showing the mechanism which engages the leads after it has moved the ends of the free end sections past the end of the template and also showing the mechanism which positions the leads into the grooves in its initial engaging position with the leads.
Figure 5:
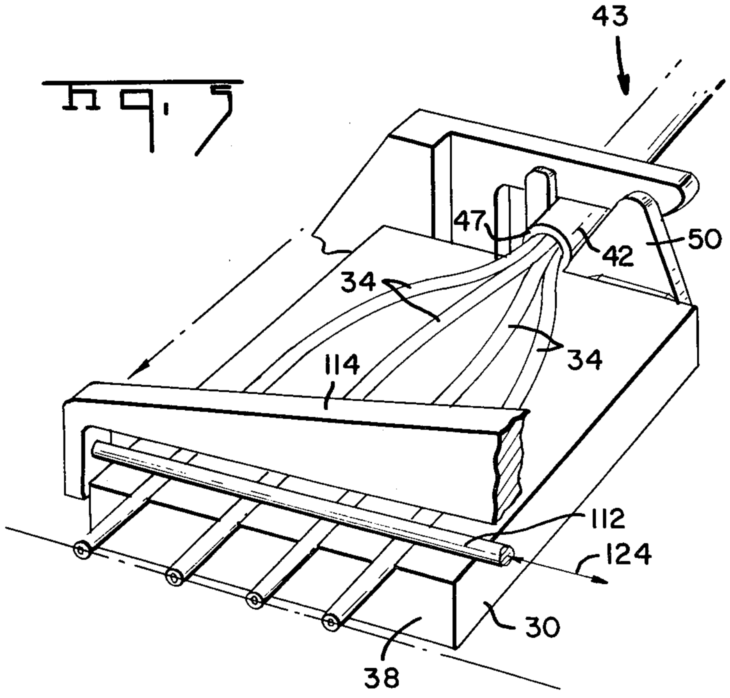
FIG. 5 is a view similar to FIGS. 2 and 4 showing the lead positioning mechanism adjacent the end of the template remote from the end of the multi-lead cable.

In operation the roller means are progressively moved from the raised inoperative position adjacent the holding means, wherein the roller is disposed above the other ends 40 of the grooves as shown in FIG. 2, to a lowered position as shown in FIG. 4, where the roller applies a compressive force to the free end lead sections to initially position them in the other end 40 of the grooves, and the roller is then moved along the grooves toward the end 36 of the grooves to progressively force the free end lead sections 34 into the grooves. Upon the completion of the work operation upon the leads the roller is then moved to its raised position adjacent the other ends 40 of the grooves and the cycle is then repeated. During the rolling operation it has been found desirable to oscillate the roller 112 in a transverse manner as indicated by the arrow 124 and suitable means may be provided to so oscillate the roller.

It has been found necessary to properly position the ends of the leads in some situations. Thus, before the leads are initially engaged by the roller, the ends of the leads must be moved away from the area of initial contact by the roller. Similarly, the ends of the leads must be moved beyond the end of the template before the roller completes its movement toward the end of the template. Also, before the leads are engaged by the lead trimming means, the ends of the leads must be moved past the lead trimming means. The movement of the ends of the leads can be completed before the leads are initially engaged by the roller, or the movement of the ends of the leads can be initiated prior to the engagement of the leads by the roller, and further movement of the ends of the leads can take place during movement of the roller. The lead engaging means 22 which positions the end of the leads include arm means indicated generally at 130, the arm means including an upper and lower outwardly extending pair of arms 132, 134, respectively, each of the arms having means 133, 135, respectively, at the outer end of the arm which projects toward the other arm, means 133 being a portion of the outer end of arm 132 which is bent downwardly as can best be seen from FIGS. 3 and 4, and the means 135 being portions of the outer end of arm 134 which are bent upwardly. The lower arm 134 extends outwardly from a first arm mounting means 136 which mounts the arm for rotational movement about the axis of pivot pin 137 and is operable to move the arm between a lower inoperative position as shown in FIG. 2 and a raised operative position as shown in FIGS. 3 and 4. The first arm mounting means 136 is carried for longitudinal and rotational movement about a second arm mounting means which includes a hollow cylindrical shaft 138 and a mounting block 139 secured to the end of shaft 138. The first arm mounting means 136 is caused to be rotated about the pivot pin 137 by a shaft 140 mounted within the shaft 138. Thus, by rotating the shaft 140 about its axis relative to the shaft 138, the arm 134 can be moved between its raised and lowered positions. The means for rotating the shaft 140 are not shown and any conventional means may be suitably employed. It should be noted however that a cam (not shown) is mounted on the end of shaft 140 within the mounting block 139, the cam engaging a cam follower (not shown) on arm 134 to pivot the arm with respect to the mounting block 139. The shaft 138 is mounted in a manner not shown in the drawings for longitudinal and rotational movement about its axis as indicated by the arrows 142, 143, respectively. The shaft 138 is operable during longitudinal movement to move the arm means between a first position which is spaced adjacent the end 40 of the plurality of grooves between the end of the template and the holding means 18 and a second position spaced beyond the other end of the template as indicated in FIG. 4. By rotating the shaft 138 the upper arm may also be moved between its raised inoperative position and its lower operative position. The arm 132 shown in the drawings is provided with only a single depending portion 133, however it may be desirable to provide the arm with other depending portions. To the same effect it may be desirable to provide the lower arm with additional upwardly extending portions. To this end, a polyurethane member 144 is shown mounted on the lower arm, the member 144 defining a gap 146 with the members 132, 133, 134, 135 when the arms are in their closed position shown in FIGS. 3 and 4. The operation of the arm means will be more fully set forth below but it should be noted that as the arms move from their initial lead engaging position shown in FIG. 3 to the location spaced beyond the end of the template shown in FIG. 4 that the arms will be in constant sliding contact with the leads 34 and will comb the ends 46 of the leads first away from the end of the template adjacent the holding means 18 to a second location where the ends 46 are caused to be moved beyond the end 38 of the template 30 to a final location wherein the ends of the leads are caused to be moved beyond the lead trimming means and the terminal applying means. The movement of the arm means will be timed with respect to the roller 112 and the lead trimming means to insure that the ends of the leads have been moved to their proper position at various portions of the operations of the roller 112 and the lead trimming means.

After the free end sections 34 of the leads have been properly combed and rolled into the grooves, subsequent work operations will be performed upon the ends of the leads. Different work operations may be performed upon the ends of the leads, such as for example trimming the ends of the leads, stripping insulation from the ends of the leads, applying terminals to the ends of the leads, and/or applying color identification to the ends of the leads.

In the apparatus shown in the drawings accompanying this application a lead trimming operation and a terminal applying operation are illustrated. In order to insure that the ends of the leads are properly trimmed it is essential that the ends be combed past the shearing or lead trimming means so that the end portions of the leads lie in the trimming area. The lead trimming means include an upper shear blade 150 and a lower shear blade 152. The upper shear blade 150 is mounted on a structure 154 which also carries a vertically movable centering device 156. The structure 154 and upper shear blade 150 are connected to an upper mounting block 158 which is in turn secured to a vertically movable slide 160 by a key 162. The slide 160 is mounted for vertical sliding movement within a slide housing 164 which is part of the press 14. The press 14 includes a rotable cam assembly 165 (FIG. 1) mounted above the upper end of the slide 160, a portion of the cam assembly 165 contacting the slide to force it downwardly against a spring 166 which is held in place by a spring retainer 168 mounted on the lower end of the slide housing 164. The spring 166 will normally hold the shear 150 and centering device 156 in their upper positions as shown in FIG. 6, with upward movement of the slide being limited by the upper surface 169 (FIG. 7) of the upper mounting block 158 moving into contact with the lower surface 170 of the housing 164.

Figure 6:
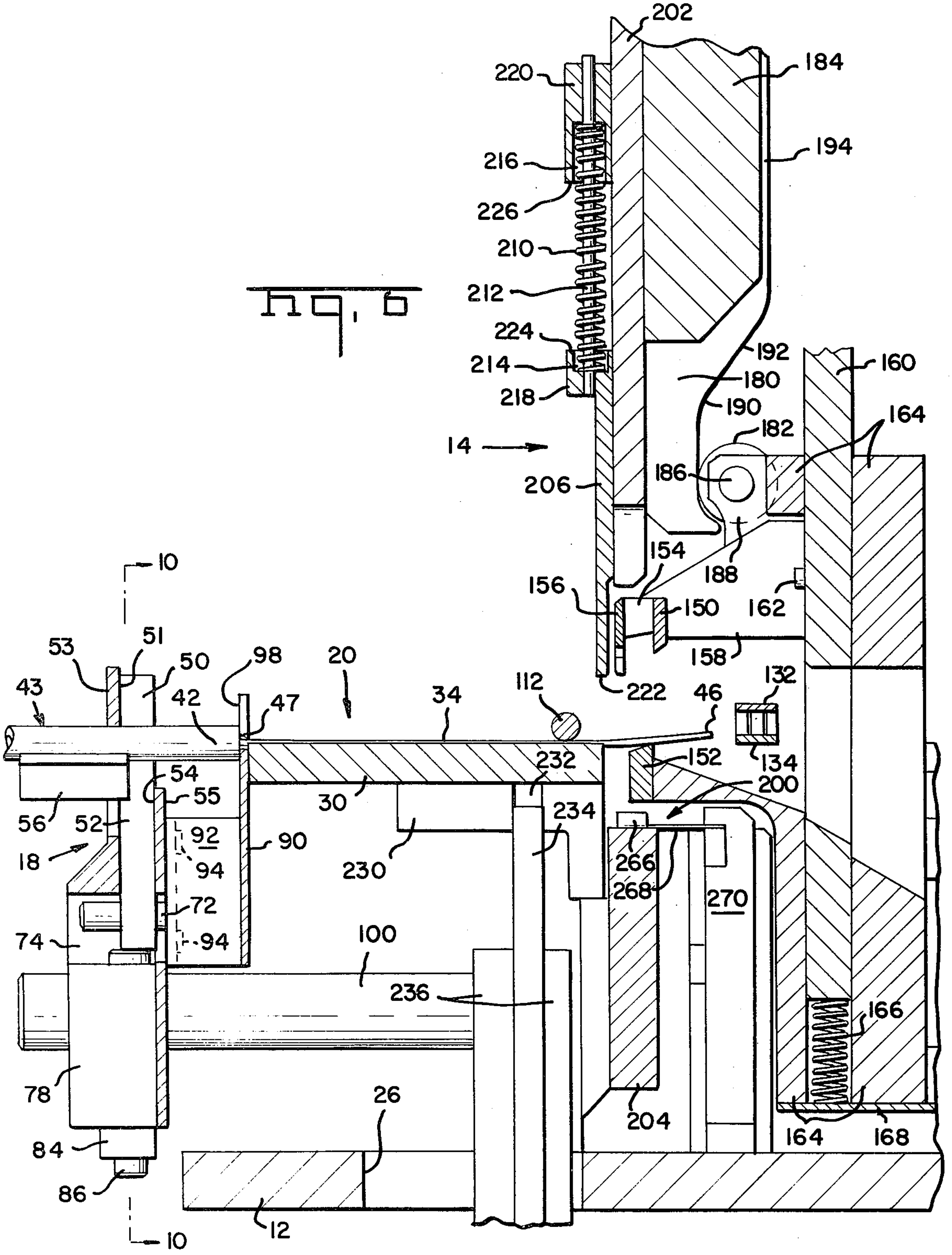
FIG. 6 is a section through the apparatus shown in FIG. 1 showing a portion of the lead positioning mechanism adjacent the end of the template remote from the end of the multi-lead cable, and the lead positioning mechanism past the ends of the leads.
Figures 7, 8, 8A, 9:
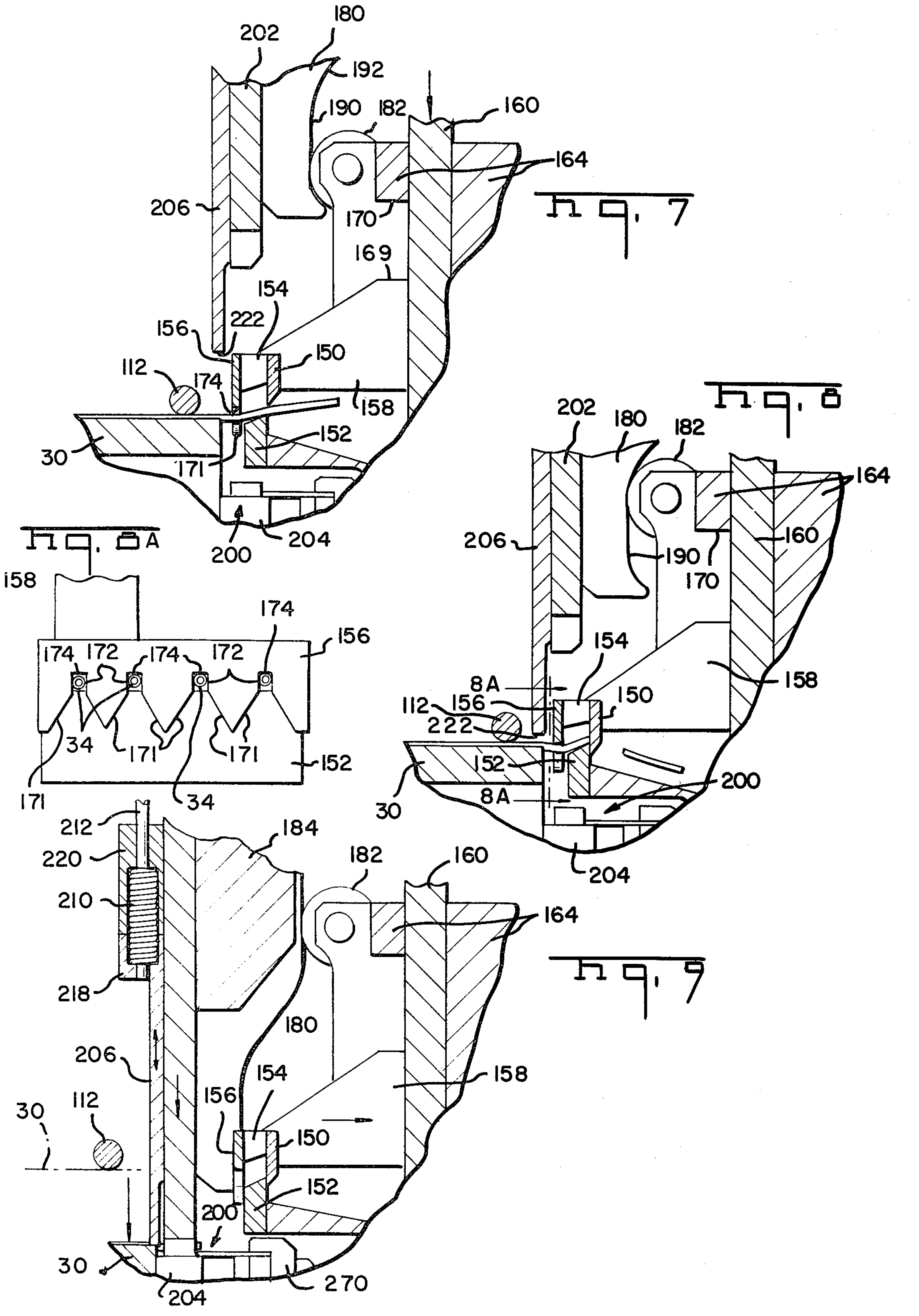
FIGS. 7, 8, and 9 are partial sectional views similar to FIG. 6 showing further operations performed upon the ends of the leads, FIG. 7 showing the initial contact of the trimming mechanism with the ends of the leads, FIG. 8 showing the completion of the trimming of the ends of the leads, and FIG. 9 showing the application of terminals to the ends of the leads.
FIG. 8A is a view taken along the lines 8A—8A in FIG. 8.

As the press cam assembly initiates downward movement of the slide 160, the upper shear 150 and centering device 156 will move downwardly from the upper position shown in FIG. 6. The downward movement of the slide, however, will not be initiated until after the arms 132, 134 have passed the ends 46 of the free end lead sections 34. The cam assembly 165 will ultimately move the upper shear blade 150 past the lower shear blade 152 in the manner indicated in FIG. 8. In order to insure that the terminals end portion of the free end lead sections 34 are in their desired position, it is necessary that they be engaged by the centering device 156. The centering device 156 has lower V-shaped notches 171 and upper channel shaped portions 172. The terminal end portions of the leads will be initially engaged by the V-shaped notches 171 and, as the centering device 156 moves downwardly, the leads will move up into the channel portions 172. The channel portions 172 are disposed in line with the grooves 32 on the template 30 and insure that the leads will extend directly away from the template. It is possible that even though the leads have been combed past the shear, that after the comb arms 132, 134 have passed beyond the ends 46 of the leads that the leads may skew. If such skewing takes place then it is not possible to properly maintain the length of the leads between the end of the template and the shears. However, by using the centering device 156 it is possible to position the leads in their desired spatial relationship immediately prior to and during trimming operations of the leads to insure that the free end portions of the leads will be sheared to a predetermined length during the shearing of the free end portions of the leads. It should further be noted that as the centering device and upper shear move downwardly that the upper surface of the leads will not be engaged by the upper end portion 174 of the channels 172 until after the ends of the lead have been sheared as indicated in FIGS. 7 and 8.

Terminals 200 are applied to the remaining terminal end portions of the leads after the ends of the free end sections 34 have been trimmed. In order to apply the terminals it is first necessary to move the shearing structure to the right hand position shown in FIG. 9, and to then move the template downwardly to permit the terminal end portions of the lead to drop into the open barrel portion of the terminals. Subsequently the barrel portion of the terminals are crimped about the terminal end portions of the lead. In order to provide for movement of the shear 150, 152 to the right it should be noted that the slide housing 164 is mounted for transverse sliding movement. While the mounting structure which permits the slide housing to slide transversely is not shown in these drawings, it should be noted that the slide housing is caused to slide to the right against spring pressure by action of a cam and cam follower.

The cam and cam follower are best shown in FIG. 6 and include a cam track 180 and a cam follower in the form of a roller 182. The cam track 180 is rigidly interconnected with a ram 184, the ram 184 being part of the press 14. The ram 184 is driven for vertical reciprocating movement by cam assembly 165 in timed relationship with respect to the slide 160. The cam follower or roller 182 is journaled about a shaft 186 that is in turn carried by a pair of upwardly extending spaced apart members 188 that are secured to the upper mounting block 158. As the slide 160 is caused to be moved downwardly from its raised position shown in FIG. 6 the cam follower 182 will be maintained in engagement with a first vertically inclined surface 190 of the cam 180. Thus, as the slide moves downwardly the ram 184 will also move downwardly as can be appreciated from a comparison of FIGS. 6, 7, and 8. After the slide has moved downwardly through the completion of the shearing action as shown in FIG. 8 there will be no further downward movement of the slide 160, however the ram 184 will continue its downward movement. Further downward movement of the ram 184 will bring the vertically inclined surface 192 of the cam 180 into engagement with the cam follower 182, and as the cam 180 moves downwardly with respect to the slide housing 164 the interengagement of the vertically inclined surface 192 with the cam follower 182 will cause the slide housing 164 to shift to the right (as viewed in FIG. 6) against spring pressure. The spring which biases the slide housing 164 to the left is not shown. However, it should be noted that the slide housing 164 is constantly biased to the left to maintain contact between the cam follower 182 and the cam 180. After the lead trimming means of shearing mechanism 150, 152 has been shifted a sufficient amount to the right the cam follower 182 will then engage the second vertical surface 194 and further downward movement of the ram will not cause further shifting of the slide housing 154. After the ram 184 has completed its downward stroke and is then moved upwardly to return it to the position shown in FIG. 6 the slide housing will move to the left as the cam follower or roller 182 again engages the vertically inclined surface 192 due to the action of the spring means which biases the housing to the left.

As the ram 184 continues its downward movement after the lead trimming means have been shifted to the right it will cause terminals, indicated generally at 200, to be crimped about the terminal end portion of the leads by the interaction of a crimper 202 and anvils 204. However, before the terminals are crimped about the terminal end portions of the free end lead sections 34 it is necessary to move the template 30 from its raised position shown in FIG. 8 to its lower position shown in FIG. 9. This is accomplished through the interaction of the wire clamp plate 206 with the template 30, the plate 206 having been shifted to its upper stop position shown in FIG. 9 prior to moving the template 30 downwardly. In this connection it should be noted that the plate 206 is mounted for vertical sliding movement between a pair of spaced apart side rails 208 (FIG. 1), the plate normally being biased to its lower position shown in FIG. 6 due to the action of a spring 210 is disposed about a rod 212, the lower end of the spring being received within a lower seat 214, and the upper end of the spring 210 being received by an upper seat 216. The lower seat 214 is formed in an upper portion 218 of the plate 206, and the lower end of the rod extends through the seat 214 and is secured to the upper portion 218. The upper seat 216 is formed in a member 220 which is rigidly interconnected with the crimper 202 and ram 184. The member 220 is provided with a bore through which the rod 212 may slide. It should be noted at this point that the force of the spring 210 is relatively small and is insufficient to move the template downwardly. Thus, as the ram 184 moves downwardly, the lower edge 222 of the plate 206 will be brought into contact with the leads at the end 38 of the template, and continued downward movement of the ram 184 will cause the plate to be maintained in contact with the end of the leads by spring pressure of the spring 210 as the spring is being compressed until the uppper surface 224 of the upper portion 218 contacts the lower surface 226 of the member 220. Further continued downward movement of the ram after this contact has been made will cause the plate 206 to force the template downwardly. It should be noted that the lower surface or edge 222 of the plate 206 serves a dual purpose in that, in addition to moving the template 30 downwardly after the surfaces 224 and 226 have come into contact with each other, it also serves to hold the leads in their desired position at the end of the template.

As has been brought out above, the template 30 is mounted for vertical movement, and to this end the template is mounted on a template mounting block being apertured as 230, the template mounting block being apertured as at 232. The upper end of a slide 234 is secured within the aperture 232. The slide 234 is in turn mounted within a slide housing 236. As illustrated somewhat schematically in FIG. 1, the lower end of the slide 234 is interconnected with a lever arm 238, the other end of the lever arm being pivotally mounted on a portion 240 of the bench. A second lower lever arm 242 is mounted parallel to the first arm 238, one end of the lower lever being vertically mounted on the lower end of portion 240. The other end of the lower lever is interconnected with the lever arm 238 by a link 244, one end of the link 244 being pivotally secured to the outer end of the lever 242, and the other end of the link 244 passing through an elongated aperture 246 in the upper lever 238. A stop 248 is mounted on the upper end of link 244 and is normally held in contact with the upper surface of the lever 238 by the action of a compression spring 250. The levers 238, 242, and link 244 form a four bar linkage, however, it should be noted that the upper lever 238 may move towards the lower lever 242 if the spring 250 is compressed. A cam 252 on rotatable shaft 254 is used to control the position of the four bar linkage, and when the dwell portion of the cam is in contact with the lower lever 242 (as indicated in FIG. 1), the four bar linkage will be in its lower position and the template 30 will be held in its lower position illustrated in FIG. 2. By rotation of the cam 252 and shaft 254 the four bar linkages may be moved to its upper position and the template 30 is then disposed in its upper position unless the spring 250 is compressed. The four bar linkage is maintained in its upper position by the cam 252 during the combing and rolling of the leads and also as the ram 184 moves downwardly. However, the cam maintains the four bar linkage in its lower position when the leads are to be stripped from the grooves after the terminals 200 have been applied to the terminal end portion of the leads, and also during the loading of another multi-lead cable in the holding means 18. As the spring force in spring 210 is less than the spring force in spring 250, the spring 210 will be fully compressed before the spring 250 is initially compressed, the spring 250 being compressed by the ram 184 as the template is moved downwardly from the position shown in FIG. 8 to the position shown in FIG. 9.

As the ram 184 completes its downward stroke, terminals 200 will be crimped about the terminal end portions of the leads 34. The terminals 200 are supplied to the apparatus in these drawings in strip form and are conveyed to the terminal applying area by a terminal conveyor indicated generally at 16. As the details of the terminal conveyor are well known in the art they will not be described here except to the extent that an arm 262 (FIG. 1) is reciprocated back and forth within an elongated aperture 264, the stroke of the arm 262 being such that terminals equal in number to the grooves in the template may be supplied to the terminal applying zone of the apparatus. Each of the terminals has a barrel portion which includes upwardly extending side walls 266. As the terminals 200 are conveyed into the terminal applying zone of the apparatus the barrel portion of the terminals are supported by the anvils 204, and another portion 268 of the terminals is supported by the terminal strip guide 270. As the ram 184 is completing its downward stroke, and as the template is being moved downwardly, the terminal end portions of the leads 34 will be laid between the spaced apart sidewalls 266 of the barrel portion. Further continued movement of the ram downwardly will, through an interaction of the crimper 202 and anvils 204, cause the side walls of the barrel portion to be crimped about the ends of the leads. As the structure of the crimper and anvils are well known to the art they will not be described here. After the terminals have been secured to the ends of the leads 34, the multi-lead cable 43 and the free end lead sections are removed or stripped from the machine and the cycle is then repeated.

OPERATION

The apparatus shown in the accompanying drawings is utilized to position, trim and apply terminals to the ends of a plurality of leads which have free end lead sections extending outwardly from the end 42 of a multi-lead cable. At the start of the operation the various elements of the apparatus are disposed in an initial position as illustrated in FIG. 1. The end 42 of the cable is then placed in the channel shaped portion 58 of the pivoted member 50 with the edge 47 of the insulation contacting the plate 90 which serves as a guide. The handle 56 is then swung from its open position shown in FIGS. 1 and 10 to its holding position shown in FIG. 11. At this point the template 30 is in its lower position due to the action of the cam which engages the end of lever 238 to permit the finished assembly to be removed from the machine. However, the template could be in its raised position during the loading of the cable within the holding means 18. It should be noted at this point that as the multi-lead cable is moved into the holding means 18 from the left side of the template (as viewed in FIG. 1) the ends 46 of the leads 34 may extend to the left of the template as shown in FIG. 2. In fact the ends may actually be bent around and extend to a location beyond the end of the template 30 adjacent the plate 90. It should also be noted at this point that if the roller 112 were to initially contact the leads after the template had been raised without further positioning of the leads that it might not be possible to satisfactorily roll the leads into the grooves as the ends of the leads might be restrained from movement towards the end 38 of the template by the roller 112. Thus, after the template has been moved to its raised position shown in FIG. 3 it is necessary to engage the leads and comb them away from the portion of the leads which are being held by the holding means 18. To this end a plurality of arms are brought into contact with the portions of the leads between the template 30 and the holding means 18, and then the arms 132, 134 are moved away from the holding means over the template while maintaining sliding engagement with the leads to cause the ends of the leads to move away from the area initially contacted by the roller 112. With extremely flexible leads it is essential that this initial movement be greater than one half of the length of the leads between the ends of the leads and that portion of the leads which are initially contacted by the roller 112. However, with less flexible leads it may be that a smaller increment of movement may be possible. The roller 112 may be moved into contact with the leads before the completion of the combing action by the arms 132, 134 as indicated in FIG. 4, or the ends of the leads may be completely combed past the shearing means 150, 152 prior to the disposition of the leads into the grooves 32. If the rolling operation is to take place during the combing action it is essential that the ends of the leads always be combed ahead of the roller to prevent the roller from engaging the ends of the leads. Similarly, it is essential that the ends of the leads must be moved beyond the end of the template prior to the completion of the rolling action.

After the free end lead sections 34 have been combed and rolled to the position indicated in FIG. 6, the roller 112 is maintained in engagement with the leads adjacent the end 38 of the template and the arms 132, 134 are moved further to the right to a position where they can be swung to an inoperative position for subsequent movement back to the initial starting position shown in FIG. 2. At this point the cam assembly 165 is rotated to move the ram 184, the centering device 156, and plate 206 downwardly causing the terminal end portion of the leads to be centered and sheared and also causing the plate 206 to come into contact with the ends of the leads above the end of the template. As the ram continues its downward movement the shearing mechanism will be cammed to the right from the positions shown in FIG. 8 to the position shown in FIG. 9, and the plate 206 will move upwardly relative to the crimper 202 until it is in its upper stop position. Further downward movement of the ram will then cause the template to be shifted from its raised position shown in dotted line in FIG. 9 to its lower position shown in full lines, the terminals 200 being crimped about the terminal end portion of the free end sections 34 when the crimper attains its lower position shown in FIG. 9. It should be noted that it is essential that the template be moved downwardly as it is not possible to trim the leads and apply the terminals in the same space as it is necessary to move the terminal end portion of the leads between the sidewalls 266 of the barrel portion of the terminal 200, and also since the combing and shearing action can not take place if the terminals 200 were in the crimping zone. Before the cam assembly causes the ram 184 to be moved upwardly the cam 252 will be rotated to its dwell position so that when the ram 184 moves upwardly the template will not move upwardly (as the stop 248 prevents upward movement of the arm 238, side 234, and the template mounting block 230) to permit the leads 34 and terminals 200 to be stripped from the machine. After the leads and terminals have been stripped from the machine the apparatus is returned to the position shown in FIG. 1 by moving the roller means 110 to this position and also by moving the arms 132, 134 to this position. It should also be noted that when the leads and terminals are stripped from the machine it is necessary to return the pivoted member 50 from its holding position shown in FIG. 11 to its cable receiving position shown in FIG. 10. As the ram 184 is caused to move upwardly during this final stage of the operation the plate 206 and shearing means 150, 152 will also return to their original position which is shown in FIG. 6.

While a preferred structure in which the principles of the present invention have been incorporated is shown and described above, it is to be understood that this invention is not to be limited to the particular details shown and described above, but that, in fact, widely different means may be employed in the broader aspects of the invention.

What is claimed is:

1. A method of performing work operations upon a plurality of leads comprising the steps of:

providing an apparatus including template means and shear means, the template means having a plurality of grooves, one end of the grooves being disposed at an end of the template means, and the shear means being disposed beyond said one end of the grooves adjacent said one end of the template means;

positioning the plurality of leads into said plurality of grooves with free end portions of said leads extending beyond the end of the template means and past the shear means;

engaging and positioning the free end portions of said leads in predetermined positions after they have been positioned in said grooves; and shearing the ends of the free end portions after said free end portions have been positioned in their predetermined positions.

2. The method set forth in claim 1 in which the free end portions are positioned to extend directly away from the template means and in line with the ends of the grooves to insure that the free end portions of the leads will be sheared to a predetermined length during the shearng of the free end portions of the leads.

3. The method set forth in claim 1 further characterized by the steps of:

providing a centering member having a plurality of notches, each of the notches having a V-shaped portion which terminates at the apex of the V-shaped portion in a channel shaped portion;

moving the centering member into engagement with the leads to engage and position the free end portions of said leads, each of the leads initially passing through the V-shaped portion of one of the plurality of notches and then being confined within the channel shaped portion as the end of the leads are sheared.

4. The method set forth in claim 1 further characterized by the step of:

applying terminals to the terminal end portion of the leads which extend away from the template means after the ends of the free end portions have been sheared.

5. An apparatus for shearing a plurality of leads including in combination:

template means having a plurality of grooves terminating adjacent one end of the template means;

means operable to position a plurality of leads in said grooves with free end portions of said leads extending beyond said one end of the template means; and lead trimming means disposed adjacent said one end of the template means and operable to shear the ends of said free end portions after said leads have been positioned in said grooves;

the combination therewith of centering means disposed adjacent said one end of the template means and operable to engage the free end portions extending beyond said one end of the template means and to position the free end portions in predetermined positions after they have been positioned in the grooves and prior to the time the ends of the leads are sheared.

6. The apparatus set forth in claim 5 in which said centering means includes a centering member having a plurality of notches, each of the notches having an inverted V-shaped portion which terminates at its upper end in an upper channel shaped portion; and means operable to move the centering member relative to the template means to cause the free end portions to initially pass through the V-shaped portions and to be disposed within the upper channel shaped portions as the ends of the leads are sheared.

7. The apparatus set forth in claim 6 in which the channel shaped portions of the centering member are in line with the ends of the grooves to insure that the free end portions of the leads will extend directly away from the template means during the shearing of the leads.

8. The apparatus set forth in claim 6 in which the lead trimming means includes upper and lower shear blades mounted for movement towards each other, said centering member being held in fixed relationship relative to the upper shear blade.

9. The apparatus set forth in claim 8 in which the ends of the leads are substantially simultaneously sheared.

10. The apparatus set forth in claim 8 in which said centering member is disposed between said one end of the template means and said upper shear blade.

11. An apparatus for shearing the ends of a plurality of leads and for applying terminals to the ends of the plurality of leads after they have been sheared, comprising in combination:

template means having a plurality of grooves terminating adjacent one end of the template means;

means operable to position a plurality of leads in said grooves with free end portions of said leads extending beyond said one end of the template means;

centering means disposed adjacent said one end of the template means and operable to engage the free end portions extending beyond said one end of the template means and to position the free end portions in predetermined positions after they have been positioned in the grooves;

lead trimming means disposed adjacent said centering means and operable to shear the ends of the free end portions after said free end portions have been disposed in said predetermined positions by said centering means; and terminal applying means operable to apply terminals to the terminal portion of the leads which extend away from the template means after the ends of the free end portions have been sheared.

* * * * *